US012261684B1

(12) United States Patent
Ovadia et al.

(10) Patent No.: US 12,261,684 B1
(45) Date of Patent: Mar. 25, 2025

(54) MINIMIZING THE IMPACT OF IN-BAND INTERFERENCE IN TRANSMISSIONS TO A CUSTOMER PREMISES EQUIPMENT (CPE) DEVICE

(71) Applicant: Charter Communications Operating, LLC, St. Louis, MO (US)

(72) Inventors: Shlomo Ovadia, Denver, CO (US); Deependra Rawat, Englewood, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 700 days.

(21) Appl. No.: 17/572,318

(22) Filed: Jan. 10, 2022

(51) Int. Cl.
*H04J 11/00* (2006.01)
*H04B 17/309* (2015.01)
*H04L 25/03* (2006.01)

(52) U.S. Cl.
CPC ........ *H04J 11/0023* (2013.01); *H04B 17/309* (2015.01); *H04L 25/03821* (2013.01)

(58) Field of Classification Search
CPC ............... H04J 11/0023; H04B 17/309; H04L 25/03821
See application file for complete search history.

(56) References Cited

U.S. PATENT DOCUMENTS

2019/0379455 A1* 12/2019 Wang ..................... H03M 3/468
2023/0156549 A1* 5/2023 Tsuda .................... H04W 36/30
                                                                                            455/440

OTHER PUBLICATIONS

Ovadia, S. et al., "Streaming Telemetry Data from the Home Network using OpenWrt Access CPE," SCTE ISBE Cable-Tec Expo 2020 Virtual Experience, Oct. 12-15, 2020, 18 pages.

* cited by examiner

*Primary Examiner* — Natasha W Cosme
(74) *Attorney, Agent, or Firm* — Dority & Manning, P.A.

(57) ABSTRACT

A plurality of signal quality values that characterize signal qualities of the corresponding OFDM channel's subcarriers of a channel used by a first cable modem to communicate with an aggregation device are received. Due to in-band interference it is determined that a first subcarrier has a first signal quality value outside of a desirable signal quality threshold range for a pre-determined period of time. The aggregation device that provides data to the first cable modem is identified. To mitigate the interference impact, a signal analyzer sends an instruction to the aggregation device that identifies the first subcarrier and the first cable modem and that instructs the aggregation device to reduce a first transmission data rate used to transmit data on the first subcarrier.

20 Claims, 6 Drawing Sheets

MINIMIZING THE IMPACT OF IN-BAND INTERFERENCE IN TRANSMISSIONS TO A CUSTOMER PREMISES EQUIPMENT (CPE) DEVICE

BACKGROUND

A customer premises equipment that communicates with a remote aggregation device via a metallic conductor, such as a coaxial cable, may experience signal interference when in proximity to wireless transmitters.

SUMMARY

The embodiments disclosed herein analyze signal quality values that characterize the signal quality of a plurality of different subcarriers used by an aggregation device and cable modem to communicate information. If the signal quality of a subcarrier is outside of a desired threshold, an instruction can be sent to the aggregation device to reduce transmission on the particular subcarrier without altering the transmission on other subcarriers.

In one embodiment a method is provided. The method includes receiving, by a computing system comprising a processor device, a plurality of signal quality values that characterize signal qualities of corresponding subcarriers of a channel used by a first cable modem to communicate with an aggregation device. The method further includes determining that a first subcarrier has a first signal quality value outside of a desirable signal quality value range for a threshold period of time. The method further includes identifying the aggregation device that provides data to the first cable modem. The method further includes sending, by the computing system to the aggregation device, an instruction that identifies the first subcarrier and the first cable modem and that instructs the aggregation device to reduce a first transmission data rate used to transmit data on the first subcarrier.

In another embodiment a computing system is provided. The computing system includes one or more processor devices of one or more computing devices. The one or more processor devices are configured to receive a plurality of signal quality values that characterize signal qualities of corresponding subcarriers of a channel used by a first cable modem to communicate with an aggregation device. The one or more processor devices are further configured to determine that a first subcarrier has a first signal quality value outside of a desirable signal quality value range for a threshold period of time. The one or more processor devices are further configured to identify the aggregation device that provides data to the first cable modem. The one or more processor devices are further configured to send, to the aggregation device, an instruction that identifies the first subcarrier and the first cable modem and that instructs the aggregation device to reduce a first transmission data rate used to transmit data on the first subcarrier.

In another embodiment a non-transitory computer-readable storage medium is provided. The non-transitory computer-readable storage medium includes executable instructions configured to cause one or more processor devices to receive a plurality of signal quality values that characterize signal qualities of corresponding subcarriers of a channel used by a first cable modem to communicate with an aggregation device. The instructions are further configured to cause the one or more processor devices to determine that a first subcarrier has a first signal quality value outside of a desirable signal quality value range for a threshold period of time. The instructions are further configured to cause the one or more processor devices to identify the aggregation device that provides data to the first cable modem. The instructions are further configured to cause the one or more processor devices to send, to the aggregation device, an instruction that identifies the first subcarrier and the first cable modem and that instructs the aggregation device to reduce a first transmission data rate used to transmit data on the first subcarrier.

Those skilled in the art will appreciate the scope of the disclosure and realize additional aspects thereof after reading the following detailed description of the embodiments in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

The embodiments set forth below represent the information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the embodiments are not limited to any particular sequence of steps. The use herein of ordinals in conjunction with an element is solely for distinguishing what might otherwise be similar or identical labels, such as "first message" and "second message," and does not imply a priority, a type, an importance, or other attribute, unless otherwise stated herein. The term "about" used herein in conjunction with a numeric value means any value that is within a range of ten percent greater than or ten percent less than the numeric value.

As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B.

A substantial number of consumers, residential and business, obtain high speed data services from a service provider that utilizes a network that includes a wired medium, such as a coaxial cable medium. A wired medium can be susceptible to in-band interference from electromagnetic radiation (EMR) transmissions in the same frequency range that is used to communicate information via the wired medium, resulting in corrupted data. Sources of such EMR can include, for example, wireless base stations, Wi-Fi® transmitters, and the like.

When a cable modem experiences corrupted data, the aggregation device, such as a cable modem termination system (CMTS), with which the cable modem communicates may reduce the transmission data rate to reduce the amount of corrupted data and increase the likelihood of recovering the corrupted data using error correction techniques. For example, the CMTS may reduce the bit-loading transmitted on each subcarrier within the selected frequency range within the orthogonal frequency division multiplexing (OFDM) channel. However, the corruption may be experienced only on certain frequencies, and in the absence of knowing which frequencies, the aggregation device may reduce the transmission data rate across the entire frequency spectrum resulting in a greater reduction in transmission data rate than would be required if the interference were only happening in certain frequency ranges and the transmission data rate reduction could be limited to such frequency ranges.

The embodiments disclosed herein analyze signal quality values that characterize the signal quality of a plurality of different subcarriers used by an aggregation device and cable modem to communicate information. If the signal quality of a subcarrier is outside of a desired threshold, an instruction can be sent to the aggregation device to reduce transmission on the particular subcarrier without altering the transmission on other subcarriers. The embodiments can thus accommodate in-band interference with a minimum of transmission data rate loss between the aggregation device and the cable modem.

Figure 1:
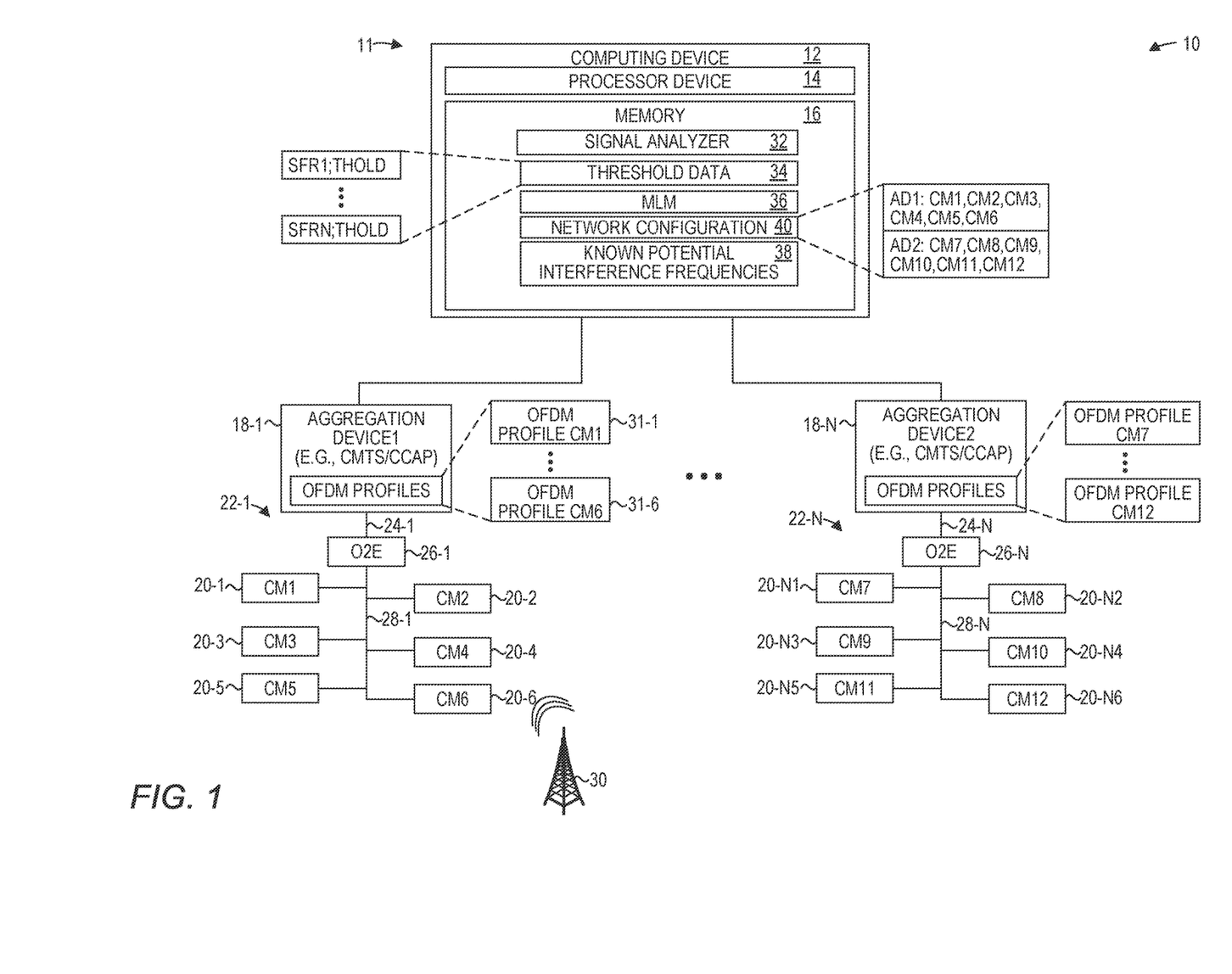
FIG. 1 is a block diagram of an environment in which embodiments may be practiced.

FIG. 1 is a block diagram of an environment 10 in which embodiments may be practiced. The environment 10 includes a computing system 11 that includes one or more computing devices 12, each of which in turn includes one or more processor devices 14 and a memory 16. The computing device 12 communicates with a plurality of aggregation devices 18-1-18-N (generally, aggregation devices 18). In some embodiments, the computing device(s) 12 may be located, for example, in a service provider's regional or national data center and operate in conjunction with an analytics and streaming platform.

Each aggregation device 18 is communicatively coupled to a plurality of customer premises equipment (CPE) devices such as, by way of non-limiting example, a plurality of cable modems 20. The modems 20-1-20-6 may be located in different residences, companies, or other entities. Each aggregation device 18 may service a different geographic area. The aggregation devices 18 may comprise any suitable devices capable of aggregating communications with the plurality of cable modems 20, such as, by way of non-limiting example, a cable modem transmission system (CMTS), a converged cable access platform (CCAP), or a Remote MACPHY Device (RMD). The aggregation devices 18 may be communicatively coupled to the computing device 12 via a network of switches and/or routers.

The aggregation device 18-1 may communicate with the plurality of cable modems 20-1-20-6 via a hybrid fiber/coaxial (HFC) cable network 22-1. In some implementations, the HFC cable network 22-1 may comprise one or more fibers 24-1 that communicatively couple the aggregation device 18-1 and an optical-to-electrical (O2E) device 26-1, and one or more coaxial cables 28-1 that communicatively couple the O2E device 26-1 with the cable modems 20-1-20-6.

Similarly, the aggregation device 18-N communicates with a plurality of cable modems 20-N1-20-N6, each of which may be located in a different residence, company, or other entity. The aggregation device 18-N may communicate with the plurality of cable modems 20-N1-20-N6 via a hybrid fiber/coaxial (HFC) cable network 22-N. In some implementations, the HFC cable network 22-N may comprise one or more fibers 24-N that communicatively couple the aggregation device 18-N and an optical-to-electrical (O2E) device 26-N, and one or more coaxial cables 28-N that communicatively couple the O2E device 26-N with the cable modems 20-N1-20-N6.

The aggregation device 18-1 may communicate with the cable modems 20-1-20-6 using a multiple frequency modulation protocol such as OFDM on the downstream (i.e., from an aggregation device 18 to a cable modem 20), and orthogonal frequency division multiplexing access (OFDMA) on the upstream (i.e., from a cable modem 20 to an aggregation device 18). Information is communicated concurrently on multiple different subcarriers. In an OFDM embodiment, a channel may be divided into a plurality of subcarriers, where each subcarrier is typically 25 kHz or 50 KHz wide. The subcarriers are orthogonal and do not interfere with one another despite the lack of guard bands.

The coaxial cable 28-1 may be sensitive to external electromagnetic radiation (EMR) at the same frequencies as the subcarriers used to communicate between the aggregation device 18-1 and the cable modems 20-1-20-6. EMR at the same frequencies may result in in-band interference and degraded performance, such as lower throughput on those subcarriers. The coaxial cable 28-1 may also be sensitive to other sources of EMR, such as internal EMR generated, for example, by a cable modem transmitter.

As an example, a downstream OFDM channel may include 3800 active sub-carriers spaced 50 kHz apart from a frequency of 781 MHz to 971 MHz. 4G cellular signals may be propagated via a base station 30 at, for example, 856.65 MHz and 852.2 MHz. If the base station 30 is in close enough proximity to, for example, the cable modems 20-6 and 20-4, the 4G signals may cause in-band interference on the subcarriers that use or overlap those same frequencies. Because the interference may be based on distance and transmit power of the source of the EMR, the amount of interference experienced by the cable modem 20-6 may be greater than the amount of interference experienced by the cable modem 20-4. While the embodiments are discussed in conjunction with known 4G frequencies, the embodiments are applicable to interference on any frequencies, including interference on 5G frequencies and the like.

The aggregation device 18-1 and the cable modems 20-1-20-6 may modulate information onto subcarriers of an OFDM channel using a desired quadrature amplitude modulation (QAM) scheme, or order, such as 64-QAM, 256-QAM, or the like. QAM modulation orders are identified based on the number of bits per symbol that are transmitted (e.g., 64 bits in 64-QAM), and the larger the number of bits per symbol, the greater the data rate. However, the higher the QAM order, the more susceptible the data is to interference.

Thus, on a subcarrier with a very good signal-to-noise ratio, a higher QAM order may be utilized to convey a larger quantity of data, while a lower QAM order may be needed to convey data on a subcarrier with a lower signal-to-noise ratio.

In conventional systems, an aggregation device may utilize a relatively small number of OFDM profiles, such as fewer than sixteen, to communicate with the cable modems coupled to the aggregation device. The OFDM profile identifies the appropriate QAM order for each subcarrier on each channel. In practice, interference or other signal degradation issues may cause the aggregation device to repeatedly switch back and forth between OFDM profiles.

In the embodiments herein, as described in greater detail herein, the aggregation device 18-1 may generate and utilize individual OFDM profiles 31-1-31-6 to communicate with the cable modems 20-1-20-6, respectively. As will be described in greater detail herein, each of the OFDM profiles 31-1-31-6 may be continuously customized for the respective cable modems 20-1-20-6 based on telemetry data received from the cable modems 20-1-20-6.

In the embodiments disclosed herein, the computing device 12 includes a signal analyzer 32 that is configured to analyze, in real time, signal quality values received from one or more of the cable modems 20. The signal quality values characterize the signal qualities of corresponding subcarriers used by the respective one or more cable modems 20. The signal analyzer 32 may determine that certain subcarriers encounter sufficient interference that a data rate should either be reduced on the subcarrier, or the subcarrier should not be used to carry data. The signal analyzer 32 may then send an instruction to the aggregation device 18 with which the respective cable modem 20 communicates to instruct the aggregation device 18 to reduce a transmission data rate of the subcarrier by, for example, using a lower QAM order than currently used, or, by inhibiting transmission on the subcarrier.

In some embodiments, one or more of the cable modems 20, such as the cable modem 20-6 for example, includes a telemetry agent that streams real-time telemetry data to the signal analyzer 32 via the aggregation device 18-1. The telemetry data may include, for example, timestamps that identify the time that the telemetry data was obtained, signal quality values that characterize signal qualities of corresponding subcarriers used to communicate information to or from the cable modem 20-6 and the percentage of correctable codewords. In some embodiments, the signal quality values comprise receive modulation error ratio (RxMER) values. The telemetry data may also identify a current QAM order used on each subcarrier and a signal-to-noise ratio in dB for each subcarrier. The telemetry data may be provided intermittently or periodically, such as every second, every five seconds, every 15 seconds, every minute, or at any other desired periodic interval. In some embodiments, the telemetry data may be sent upon the occurrence of an event, such as a change in a signal quality value or based on some pre-determined reporting period. Alternatively, in some embodiments, the signal analyzer 32 may periodically request the plurality of signal values from the cable modem 20-6.

The signal analyzer 32 receives the telemetry data from the cable modem 20-6 and processes the telemetry data to determine whether any signal quality values are outside of a desirable signal quality value range. In some embodiments, the signal analyzer 32 may require that the signal quality values be outside of the desirable signal quality value range for a period of time, such as minutes, hours, or days, to ensure that the interference is not a transient issue.

In one embodiment, the signal analyzer 32 uses threshold data 34 that may identify desirable signal quality value ranges, or undesirable signal quality value ranges. The ranges may differ depending on the frequency of the subcarrier. By way of non-limiting example, a threshold of 41 dB may be used for subcarriers between 781 MHz and 866 MHz and a threshold of 38 dB may be used for subcarriers between 866 MHz and 971 MHz. In some embodiments, the signal analyzer 32 may provide the signal quality values to a machine-learning model (MLM) 36 that has been trained and, based on the output of the MLM 36, determines the appropriate threshold values for various subcarriers or ranges of subcarriers within the OFDM channel. Note that while only a single MLM 36 is illustrated, in practice, a separate MLM 36 may be trained and refined over time for each cable modem 20.

The signal analyzer 32 may, in some embodiments, only analyze the signal quality values associated with certain known potential interference frequencies 38, such as those frequencies used by cellular base stations.

If the signal analyzer 32 determines that the signal quality values are outside of a desirable signal quality value range, the signal analyzer 32 may access a network configuration 40 that identifies, for each cable modem 20, the particular aggregation device 18 to which the cable modem 20 is communicatively coupled. Based on the network configuration 40, the signal analyzer 32 determines that the cable modem 20-6 is communicatively coupled to the aggregation device 18-1. The signal analyzer 32 may then send the aggregation device 18-1 an instruction that identifies the cable modem 20-6 and the subcarrier(s) that are outside of the desirable signal quality value range, and that instructs the aggregation device 18-1 to reduce the transmission data rate of the subcarrier. The instruction may identify a particular QAM order, or simply direct the aggregation device 18-1 to drop to a lower QAM order than the current QAM order used on the subcarrier. The instruction may instruct the aggregation device 18-1 to no longer transmit on the subcarrier. The aggregation device 18-1 maintains configuration information that identifies the QAM orders for each subcarrier for each of the cable modems 20-1-20-6. The aggregation device 18-1 modifies the configuration information in accordance with the instruction.

The signal analyzer 32 may instruct the aggregation device 18-1 to reduce the transmission data rate of different subcarriers differently. For example, for a first subcarrier experiencing substantial interference, the signal analyzer 32 may instruct the aggregation device 18-1 to utilize a first lower QAM order, and for a second subcarrier experiencing moderate interference, the signal analyzer 32 may instruct the aggregation device 18-1 to utilize a second lower QAM order, wherein the first lower QAM order is a lower QAM order than the second lower QAM order. Alternatively, for a first subcarrier experiencing substantial interference, the signal analyzer 32 may instruct the aggregation device 18-1 to stop transmitting data on the first subcarrier, and for a second subcarrier experiencing moderate interference, the signal analyzer 32 may instruct the aggregation device 18-1 to utilize a lower QAM order than the current QAM order.

In some embodiments, the signal analyzer 32 may monitor the subcarriers over time, record those subcarriers that have signal quality values outside of the desirable signal quality value range, and record the corresponding timestamp. The signal analyzer 32 may monitor the subcarriers over time, and require that the signal quality values be outside of the desirable signal quality value range for a plurality of days prior to sending an instruction to the aggregation device 18-1 to reduce the transmission data rate of the subcarrier.

In some embodiments, the signal analyzer 32 may similarly analyze the signal quality values of cable modems in geographic proximity to the cable modem 20-6, such as the cable modems 20-4, 20-2, 20-3, and 20-5, to determine whether such cable modems are also encountering interference on the same subcarriers. If the external interference is impacting a group of cable modems 20 in a specific geographical area, it may be determined that a preferred solution is to bury in the ground the air-suspended coaxial cable, replace the existing coaxial cable with better shielded coaxial cable, work with the cell tower operator to reduce the cell interference, or relocate the OFDM channel to a different frequency band.

In some embodiments, the signal analyzer 32 may store information that identifies the cable modems 20 and the aggregation devices 18 for which instructions have been sent to reduce transmission data rates on a subcarrier. The signal analyzer 32 may subsequently monitor the signal quality values received from such a cable modem 20 and subsequently determine that the signal quality values for the subcarrier are now within the desirable signal quality value range, and thus that the source of interference is no longer a source of interference. The signal analyzer 32 may then send the corresponding aggregation device 18 an instruction that identifies the subcarrier and the cable modem 20 and that instructs the aggregation device 18 that a reduced transmission data rate is no longer needed.

It is noted that, because the signal analyzer 32 is a component of the computing device 12, functionality implemented by the signal analyzer 32 may be attributed to the computing device 12 generally. Moreover, in examples where the signal analyzer 32 comprises software instructions that program the processor device 14 to carry out functionality discussed herein, functionality implemented by the signal analyzer 32 may be attributed herein to the processor device 14. Moreover, while for purposes of illustration and simplicity functionality has been attributed to a single component, the signal analyzer 32, in practice, may comprise multiple components which may concurrently execute on different computing devices 12 of the computing system 11 and which are communicatively coupled together to implement the functionality attributed herein to the signal analyzer 32.

Figure 2:
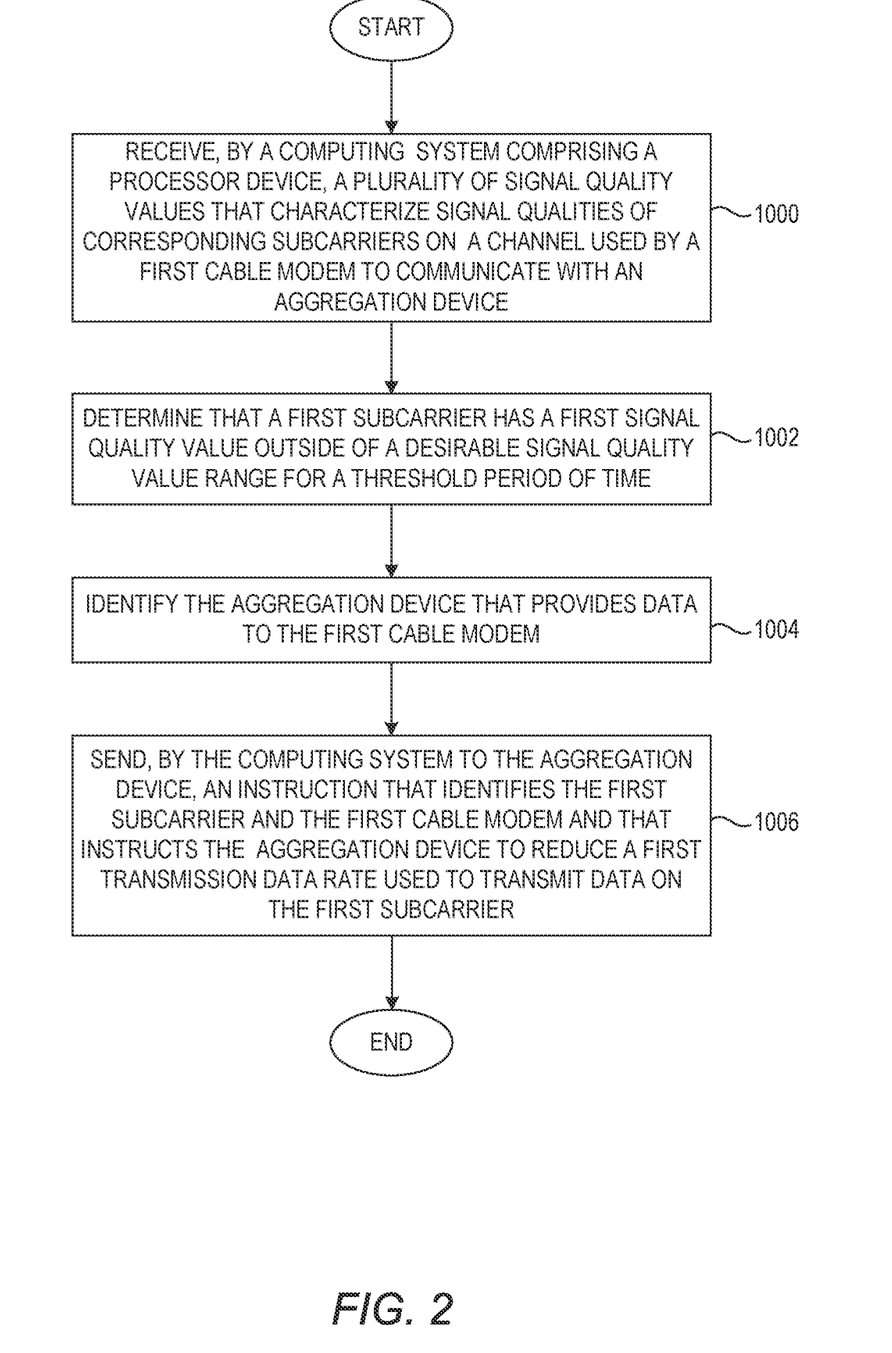
FIG. 2 is a flowchart of a method for minimizing the impact of in-band interference in transmissions to a customer premises equipment (CPE) device according to one embodiment.

FIG. 2 is a flowchart of a method for reducing wireless interference in transmissions with a customer premises equipment according to one embodiment. FIG. 2 will be discussed in conjunction with FIG. 1. The signal analyzer 32 receives the plurality of signal quality values that characterize signal qualities of corresponding subcarriers of a channel used by the cable modem 20-6 to communicate with the aggregation device 18-1 (FIG. 2, block 1000). The signal analyzer 32 determines that a first subcarrier has a signal quality value outside of a desirable signal quality value range for a threshold period of time (FIG. 2, block 1002). The signal analyzer 32 identifies the aggregation device 18-1 that provides data to the cable modem 20-6 (FIG. 2, block 1004). The signal analyzer 32 sends, to the aggregation device 18-1, an instruction that identifies the first subcarrier and the cable modem 20-6 and that instructs the aggregation device 18-1 to reduce a transmission data rate used to transmit data on the first subcarrier (FIG. 2, block 1006).

Figure 3:
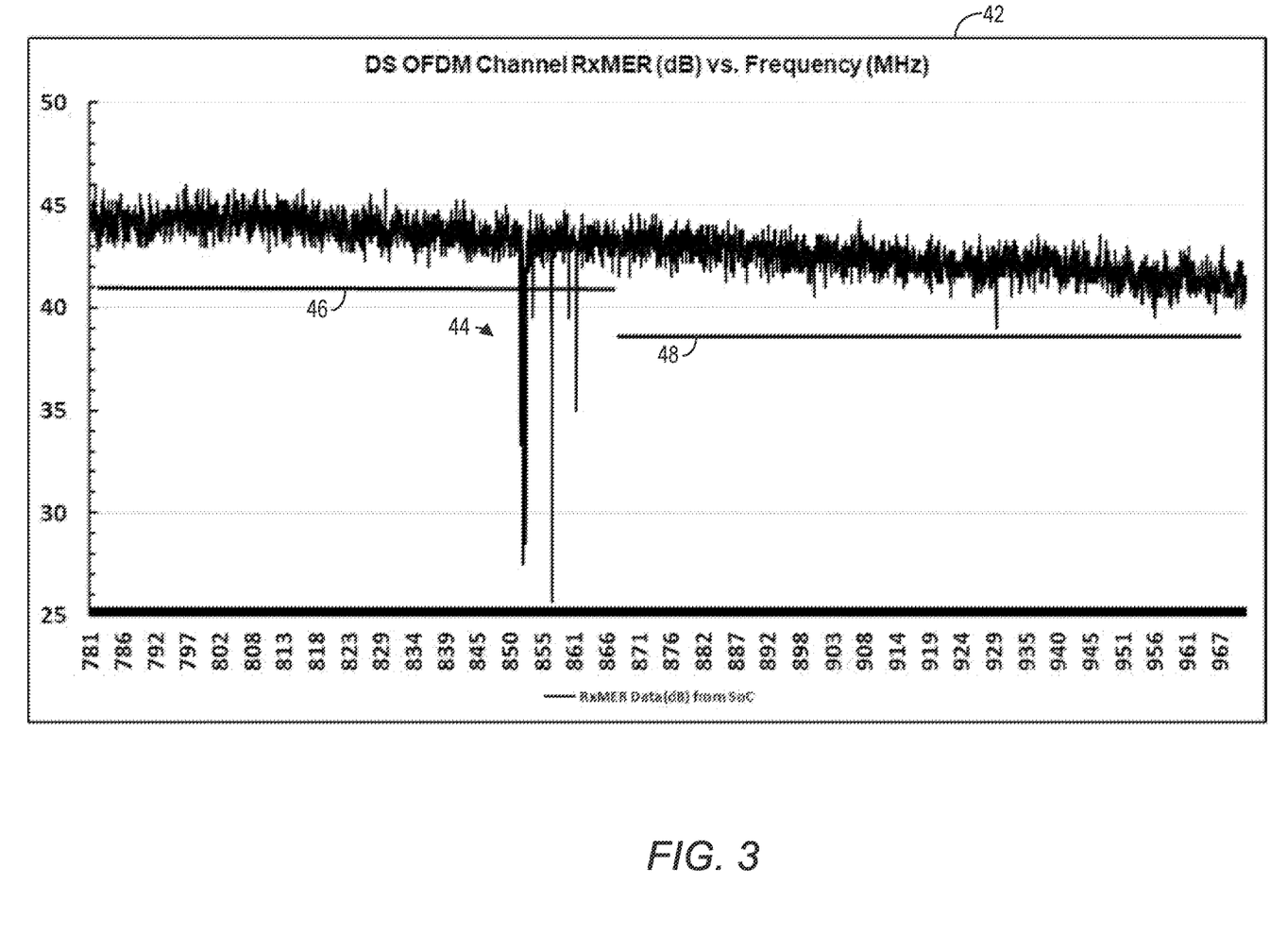
FIG. 3 illustrates a graph depicting signal quality values of a cable modem at an instant in time according to one embodiment.

FIG. 3 illustrates a graph 42 depicting signal quality values of the cable modem 20-6 at an instant in time according to one embodiment. In this embodiment, the signal quality values comprise RxMER values. The Y-axis identifies decibel levels, and the X-axis identifies frequencies (MHz). The graph 42 illustrates interference 44 at a range of frequencies including frequencies at 856.65 MHz and 852.2 MHz. It is known that a trunked GSM-810 band (T-GSM-810) has a downlink frequency band (base to mobile) from 851.2 MHz to 866.2 MHz, and thus, the cable modem 20-6 is likely in proximity to a GSM base station, such as the base station 30. This type of interference may sometimes be referred to as LTE ingress. The signal interference resulted in the RxMER dropping 17.5 dB from about 42.5 dB to about 25 dB in the 850-862 MHZ frequency range while not impacting the other subcarriers in the OFDM signal. In this embodiment, the signal analyzer 32 may utilize a threshold 46 of 41 dB for subcarriers between about 781 MHz and 866 MHz, and a threshold 48 of 38 dB for subcarriers between about 866 MHz and 971 MHz. It is apparent that these frequencies are only examples of frequencies which may experience interference, and other potential frequencies on which interference may be experienced, include, by way of non-limiting example, downlink GSM/CDMA (824-849 MHZ) and downlink GSM900 (925-960 MHz).

Figure 4:
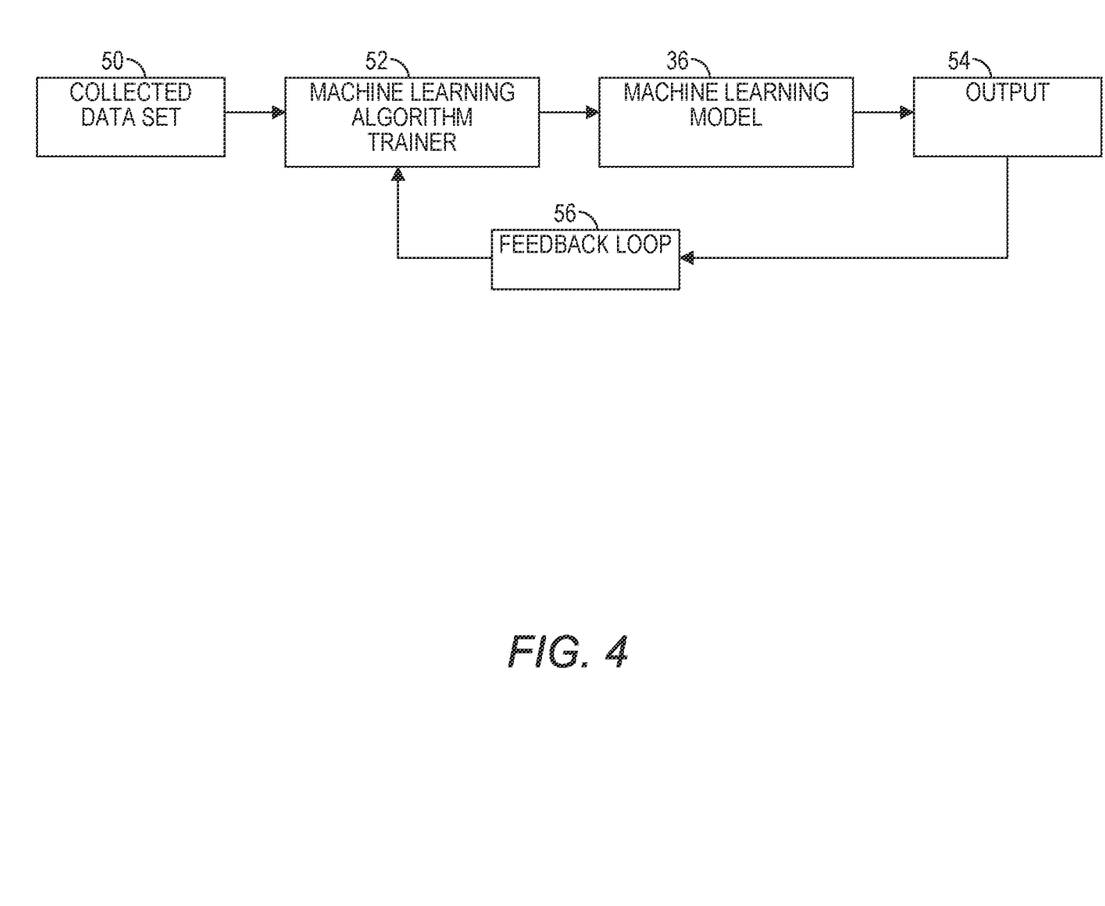
FIG. 4 is a block diagram of a training process for a machine-learning model for reducing wireless interference in transmissions with a CPE device according to one embodiment.

FIG. 4 is a block diagram of a training process for the machine-learning model 36 for reducing wireless interference in transmissions with a CPE device, such as the cable modem 20-1, according to one embodiment. A collected data set 50 that comprises telemetry data, such as RxMER values, is generated. The collected data set 50 may include, for example, historical data for similar cable modems served by the same or similar aggregation device, with corresponding OFDM profiles (e.g., QAM values along with RxMER ranges), as well as a percentage of correctable codewords value that identifies a percentage of codewords that the cable modem was able to correct.

An OFDM profile may include the OFDM channel parameters required for normal operation such as the QAM orders, RxMER values, cyclic prefix and roll-off parameters, etc. Other parameters may include, by way of non-limiting example, the percentage of correctable codewords. For robust operation, it is desirable to have near 100% correctable codewords. However, the percentage of correctable codewords may be significantly reduced in the presence of cellular interference. A cable modem may have multiple OFDM profiles for different type of traffic (e.g., unicast vs. broadcast).

A machine-learning (ML) algorithm trainer 52 establishes initial RxMER threshold levels (e.g., thresholds 46, 48 in FIG. 3), OFDM profile parameters, and other parameter ranges (such as, OFDM received channel power, OFDM channel tilt, and the like) for normal signal quality values required for normal operating mode for the cable modem 20-1. A trained MLM 36 is generated and identifies initial threshold levels (e.g., output 54) for the subcarriers for the cable modem 20-1. An automated feedback loop 56, discussed in greater detail in FIG. 5, may involve continuous refinement of the ML algorithm trainer 52.

Figure 5:
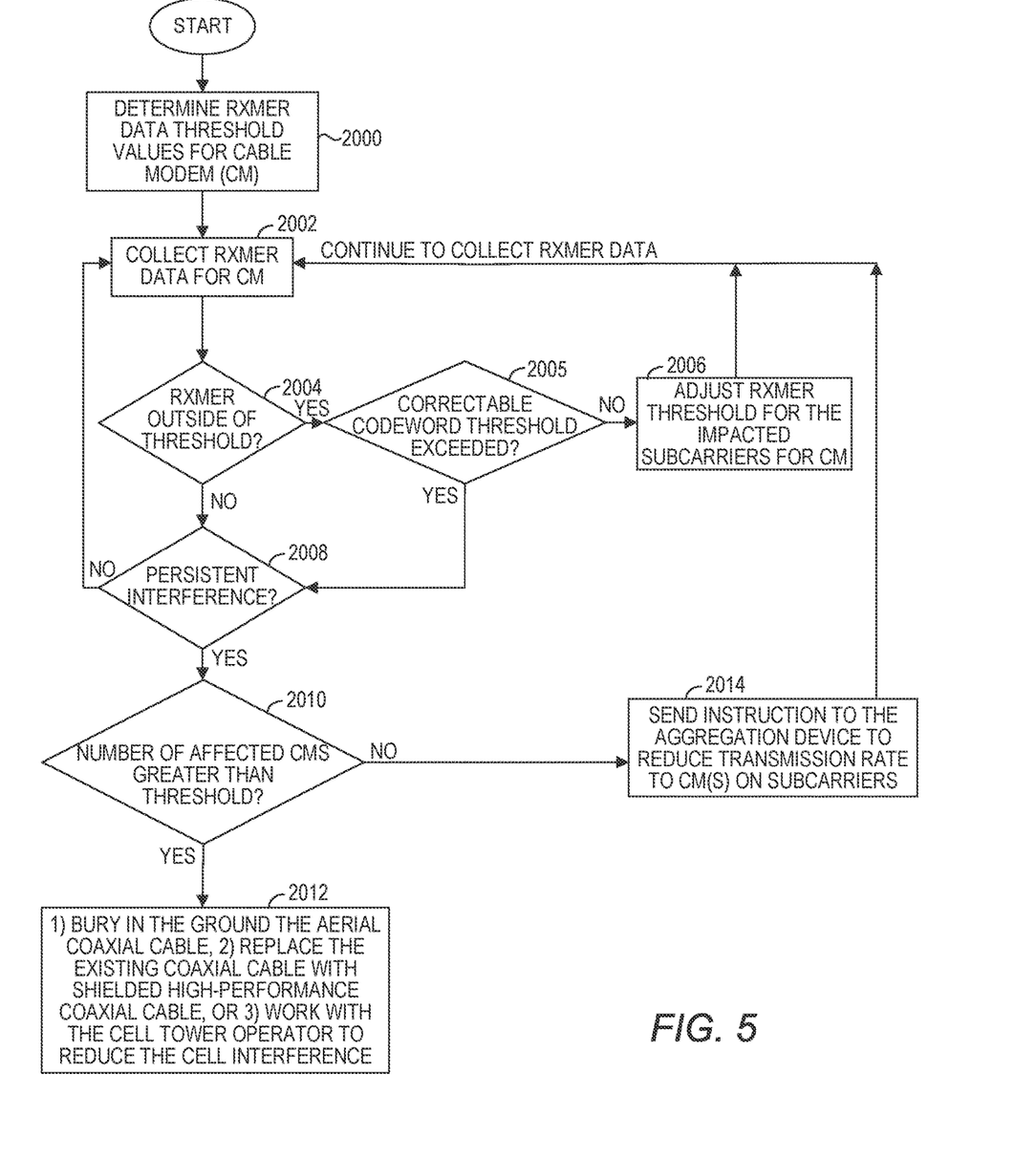
FIG. 5 is a flowchart of a method for utilizing and optimizing a machine-learning model over time, according to one embodiment.

FIG. 5 is a flowchart of a method for utilizing and optimizing the MLM 36 for use with the cable modem 20-1 over time, according to one embodiment. The process described herein may be run separately on multiple channels used by the cable modem 20-1 to communicate with the aggregation device 18-1. At step 2000, initial RxMER threshold values are determined for each subcarrier of the selected OFDM channel. These may be obtained, for example, from the MLM 36 based on the initial training described above with regard to FIG. 4, or may be based on historical information for cable modems 20 that are similar to the cable modem 20-1, or determined in any other suitable fashion. The signal analyzer 32 may, based on the initial threshold levels, generate one or more OFDM profiles for the aggregation device 18-1 to use when transmitting data to the cable modem 20-1. The aggregation device 18-1 manages the OFDM profiles based on instructions from the signal analyzer 32.

At step 2002, signal quality values, such as RxMER values, are continuously received from the cable modem 20-1. The RxMER values identify a real-time RxMER for each subcarrier. At step 2004, it is determined, for each subcarrier, whether the received RxMER value is outside of a current threshold for each subcarrier. In some embodiments, it may be determined if the RxMER is farther outside a desired threshold value, either greater or less, than an amount greater than a delta amount, such as 2 or 3 decibels. At step 2005, a percentage of correctable codewords received from the cable modem 20-1 may be compared to a correctable codeword threshold, such as 95 or the like, by way of non-limiting example. If the percentage of correctable codewords received from the cable modem 20-1 exceeds the correctable codeword threshold, then this is an indication that the current RxMER threshold is a good value, and processing continues to step 2008. If the percentage of correctable codewords received from the cable modem 20-1 is below the correctable codeword threshold, then this is an indication that the current RxMER threshold may need adjustment, and at step 2006, the thresholds may be adjusted for each subcarrier. As an example, if the received RxMER value is below a current threshold for a subcarrier, the threshold may be decreased to be a predetermined level below that of the RxMER value, such as 2 or 3 decibels below. If the receive RxMER value is greater than 2 or 3 decibels above the current threshold, then the threshold may be increased to be a predetermined level below that of the RxMER value, such as 2 or 3 decibels below. This latter situation may happen, for example, when a source of interference stops causing interference. The RxMER threshold value is adaptive, and a good RxMER threshold value may be one wherein the number of correctable codewords is near 100%.

Processing returns to step 2002 to receive new RxMER values, and the process repeats. If the RxMER is not outside of the current threshold, then, at step 2008, it is determined whether any interference is persistent. Persistence may be defined an any predetermined period of time, such as, by way of non-limiting example, a predetermined number of days, weeks, or any other suitable timeframe. To determine persistence, the signal analyzer 32 may start a timer for a pre-determined period of time and determine if the interference still exists when the timer expires.

If the interference is not persistent, processing returns to step 2002. If the interference is persistent, at step 2010 it is determined if a number of cable modems 20 fewer than some predetermined threshold are experiencing the interference or if the number of cable modems 20 experiencing the interference are greater than the predetermined threshold. If the number of cable modems 20 experiencing the interference are greater than the predetermined threshold, at step 2012, a number of different actions may be taken, such as, by way of non-limiting example, the coaxial cable serving the cable modems 20 may be buried underground, or the coaxial cable may be replaced with a shielded high-performance cable, or discussions with the source of the interference may be initiated to reduce the interference.

If the number of cable modems 20 experiencing the interference are fewer than the predetermined threshold, then at step 2014, the signal analyzer 32 sends instructions to the aggregation device 18-1 to reduce the transmission data rate to the impacted subcarriers on the cable modem 20-1 based on the determined threshold. The aggregation device 18-1 then updates the OFDM profile 31-1 that corresponds to the cable modem 20-1 based on the instruction from the signal analyzer 32.

In some embodiments, step 2012 may be implemented only if a certain quantity threshold, or percentage threshold, of cable modems 20 are impacted by the interference. Thus, if a quantity of cable modems 20 fewer than the quantity threshold or percentage threshold are impacted, the signal analyzer 32 may send instructions to the corresponding aggregation device 20 to reduce the transmission data rate for each of such cable modems 20. If, on the other hand, the quantity of cable modems 20 greater than the quantity threshold or percentage threshold are impacted, one or more of the actions identified in step 2012 may be performed.

Figure 6:
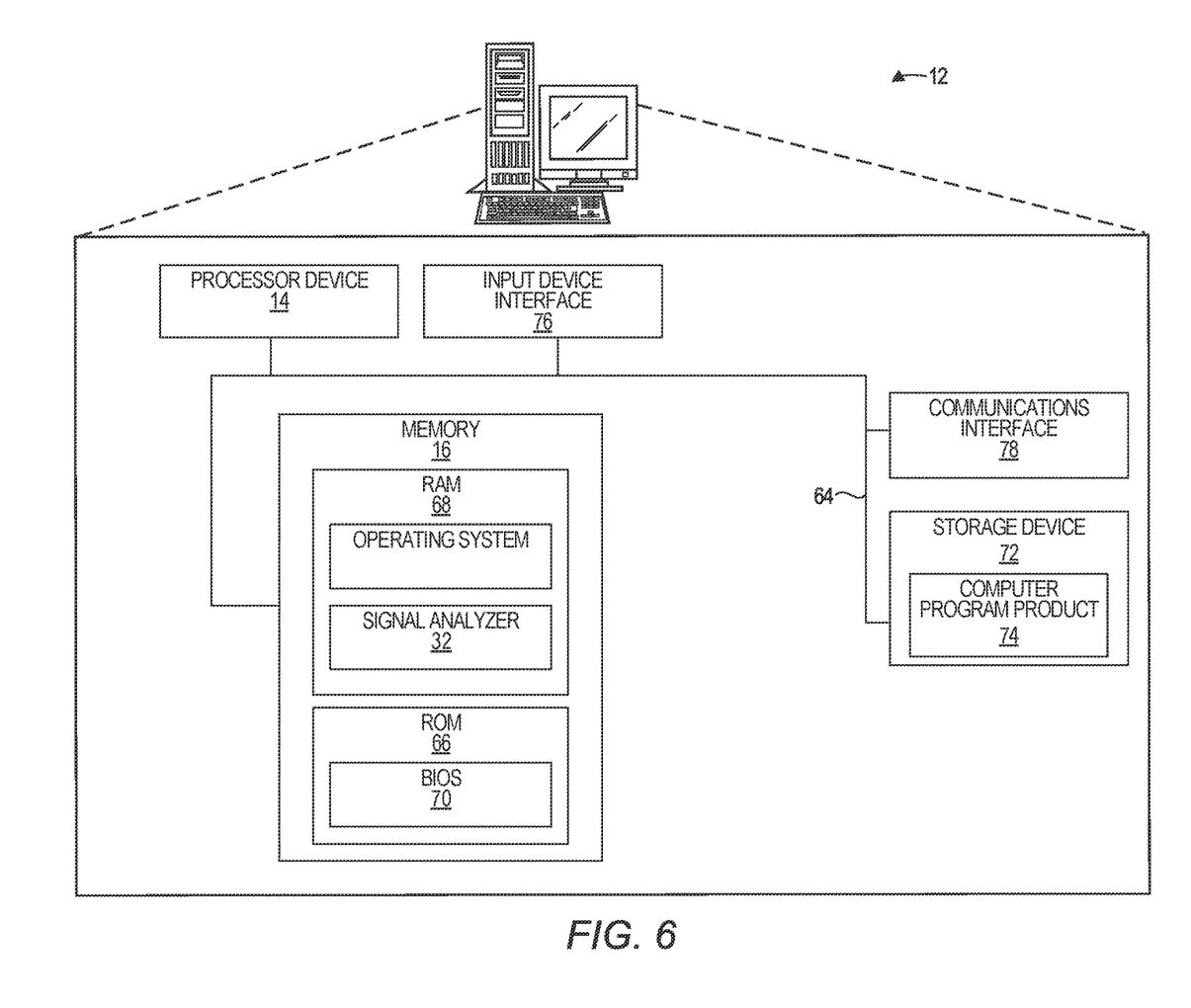
FIG. 6 is a block diagram of a computing device suitable for implementing the embodiment disclosed herein.

FIG. 6 is a block diagram of the computing device 12 suitable for implementing examples according to one example. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 14, the system memory 16, and a system bus 64. The system bus 64 provides an interface for system components including, but not limited to, the system memory 16 and the processor device 14. The processor device 14 can be any commercially available or proprietary processor.

The system bus 64 may be any of several types of bus structures that may further interconnect to a memory bus (with or without a memory controller), a peripheral bus, and/or a local bus using any of a variety of commercially available bus architectures. The system memory 16 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 12. The volatile memory 68 may also include a high-speed RAM, such as static RAM, for caching data.

The computing device 12 may further include or be coupled to a non-transitory computer-readable storage medium such as a storage device 72, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 72 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 72 and in the volatile memory 68, including an operating system and one or more program modules, such as the signal analyzer 32, which may implement the functionality described herein in whole or in part. All or a portion of the examples may be implemented as a computer program product 74 stored on a transitory or non-transitory computer-usable or computer-readable storage medium, such as the storage device 72, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14. The processor device 14, in conjunction with the signal analyzer 32 in the volatile memory 68, may serve as a controller, or control system, for the computing device 12 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 14 through an input device interface 76 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 12 may also include a communications interface 78 suitable for communicating with a network as appropriate or desired.

Those skilled in the art will recognize improvements and modifications to the preferred embodiments of the disclosure. All such improvements and modifications are considered within the scope of the concepts disclosed herein and the claims that follow.

What is claimed is:

1. A method comprising:
   receiving, by a computing system comprising a processor device, a plurality of signal quality values that characterize signal qualities of corresponding subcarriers of a channel used by a first cable modem to communicate with an aggregation device;
   determining that a first subcarrier has a first signal quality value outside of a desirable signal quality value range for a threshold period of time;
   identifying the aggregation device that provides data to the first cable modem; and
   sending, by the computing system to the aggregation device, an instruction that identifies the first subcarrier and the first cable modem and that instructs the aggregation device to reduce a first transmission data rate used to transmit data on the first subcarrier.

2. The method of claim 1 wherein the instruction instructs the aggregation device to reduce the first transmission data rate on the first subcarrier by using a lower quadrature amplitude modulation (QAM) order than a current QAM order used to transmit data on the first subcarrier.

3. The method of claim 1 wherein the instruction instructs the aggregation device to reduce the first transmission data rate on the first subcarrier by no longer transmitting data on the first subcarrier.

4. The method of claim 1 wherein receiving the plurality of signal quality values that characterize signal qualities of corresponding subcarriers used by the first cable modem further comprises receiving, over a period of time from the first cable modem, the plurality of signal quality values.

5. The method of claim 1 wherein receiving the plurality of signal quality values that characterize signal qualities of corresponding subcarriers used by the first cable modem further comprises periodically requesting, by the computing system from the first cable modem, the plurality of signal quality values.

6. The method of claim 1 further comprising determining that a second subcarrier has a second signal quality value outside of the desirable signal quality value range for the threshold period of time and wherein the instruction further identifies the second subcarrier and instructs the aggregation device to reduce a second transmission data rate used to transmit data on the second subcarrier.

7. The method of claim 6 wherein the instruction instructs the aggregation device to reduce the first transmission data rate used to transmit data on the first subcarrier by using a lower QAM order than a current QAM order used to transmit data on the first subcarrier, and instructs the aggregation device to reduce the second transmission data rate used to transmit data on the second subcarrier by no longer transmitting data on the second subcarrier.

8. The method of claim 6 wherein the instruction instructs the aggregation device to reduce the first transmission data rate used to transmit data on the first subcarrier by using a first lower QAM order than a current QAM order used to transmit data on the first subcarrier, and instructs the aggregation device to reduce the second transmission data rate used to transmit data on the second subcarrier by using a second lower QAM order than a current QAM order used to transmit on the second subcarrier, the second lower QAM order being different from the first lower QAM order.

9. The method of claim 1 further comprising:
   subsequent to sending the instruction to the aggregation device, receiving an additional plurality of signal quality values that characterizes signal qualities of corresponding subcarriers used by the first cable modem to communicate with the aggregation device;
   determining, based on the additional plurality of signal quality values, that the first subcarrier has a second signal quality value within the desirable signal quality value range; and
   sending, by the computing system to the aggregation device, an instruction that identifies the first subcarrier and the first cable modem and that instructs the aggregation device that a reduced transmission data rate is no longer needed.

10. The method of claim 1 wherein the plurality of signal quality values that characterize the signal qualities of the corresponding subcarriers comprises a plurality of receive modulation error ratio (RxMER) values.

11. The method of claim 1 further comprising:
    receiving a set of signal quality values that characterize signal qualities of corresponding subcarriers used by the first cable modem and corresponding timestamps that identify the times that the signal quality values were determined;
    training a machine-learning model with the set of signal quality values and the timestamps;
    sending, to the machine-learning model, the plurality of signal quality values; and
    wherein determining that the first subcarrier has the first signal quality value outside of the desirable signal quality value range for the threshold period of time comprises receiving, from the machine-learning model, an indication that the first subcarrier has the first signal quality value outside of the desirable signal quality value range.

12. The method of claim 1 wherein the cable modem is directly coupled to a coaxial cable.

13. The method of claim 1 wherein the aggregation device comprises a cable modem termination system (CMTS), a converged cable access platform (CCAP), or a Remote MACPHY Device (RMD).

14. The method of claim 1 wherein the channel comprises an orthogonal frequency division multiplexing (OFDM) channel.

15. The method of claim 1 further comprising:
receiving, by the processor device, a percentage of correctable codewords value that identifies a percentage of codewords that the first cable modem was able to correct; and
determining that the percentage of correctable codewords value is below a correctable codeword threshold.

16. A computing system comprising:
one or more processor devices of one or more computing devices, the one or more processor devices configured to:
receive a plurality of signal quality values that characterize signal qualities of corresponding subcarriers of a channel used by a first cable modem to communicate with an aggregation device;
determine that a first subcarrier has a first signal quality value outside of a desirable signal quality value range for a threshold period of time;
identify the aggregation device that provides data to the first cable modem; and
send, to the aggregation device, an instruction that identifies the first subcarrier and the first cable modem and that instructs the aggregation device to reduce a first transmission data rate used to transmit data on the first subcarrier.

17. The computing system of claim 16 wherein the instruction instructs the aggregation device to reduce the first transmission data rate used to transmit data on the first subcarrier by using a lower QAM order than a current QAM order used to transmit data on the first subcarrier, and instructs the aggregation device to reduce a second transmission data rate used to transmit data on a second subcarrier by no longer transmitting data on the second subcarrier.

18. The computing system of claim 16 wherein the instruction instructs the aggregation device to reduce the first transmission data rate used to transmit data on the first subcarrier by using a first lower QAM order than a current QAM order used to transmit data on the first subcarrier, and instructs the aggregation device to reduce a second transmission data rate used to transmit data on a second subcarrier by using a second lower QAM order than a current QAM order used to transmit on the second subcarrier, the second lower QAM order being different from the first lower QAM order.

19. The computing system of claim 16, wherein the one or more processor devices are further configured to:
receive a set of signal quality values that characterize signal qualities of corresponding subcarriers used by the first cable modem and corresponding timestamps that identify the times that the signal quality values were determined;
train a machine-learning model with the set of signal quality values and the timestamps;
send, to the machine-learning model, the plurality of signal quality values; and
wherein to determine that the first subcarrier has the first signal quality value outside of the desirable signal quality value range for the threshold period of time, the one or more processor devices are further configured to receive, from the machine-learning model, an indication that the first subcarrier has the first signal quality value outside of the desirable signal quality value range.

20. A non-transitory computer-readable storage medium that includes executable instructions configured to cause one or more processor devices to:
receive a plurality of signal quality values that characterize signal qualities of corresponding subcarriers of a channel used by a first cable modem to communicate with an aggregation device;
determine that a first subcarrier has a first signal quality value outside of a desirable signal quality value range for a threshold period of time;
identify the aggregation device that provides data to the first cable modem; and
send, to the aggregation device, an instruction that identifies the first subcarrier and the first cable modem and that instructs the aggregation device to reduce a first transmission data rate used to transmit data on the first subcarrier.

* * * * *